US012113291B2

(12) United States Patent
Sun et al.

(10) Patent No.: US 12,113,291 B2
(45) Date of Patent: Oct. 8, 2024

(54) MULTIBAND BASE STATION ANTENNAS HAVING WIDEBAND CLOAKED RADIATING ELEMENTS AND/OR SIDE-BY-SIDE ARRAYS THAT EACH CONTAIN AT LEAST TWO DIFFERENT TYPES OF RADIATING ELEMENTS

(71) Applicant: Outdoor Wireless Networks LLC, Claremont, NC (US)

(72) Inventors: Bin Sun, Suzhou (CN); Honghui Chen, Suzhou (CN); Yuemin Li, Suzhou (CN)

(73) Assignee: Outdoor Wireless Networks LLC, Claremont, NC (US)

( * ) Notice: Subject to any disclaimer, the term of this patent is extended or adjusted under 35 U.S.C. 154(b) by 320 days.

(21) Appl. No.: 17/440,089

(22) PCT Filed: Mar. 26, 2019

(86) PCT No.: PCT/CN2019/079630
§ 371 (c)(1),
(2) Date: Sep. 16, 2021

(87) PCT Pub. No.: WO2020/191605
PCT Pub. Date: Oct. 1, 2020

(65) Prior Publication Data

US 2022/0190487 A1 Jun. 16, 2022

(51) Int. Cl.
*H01Q 1/24* (2006.01)
*H01Q 1/52* (2006.01)
(Continued)

(52) U.S. Cl.
CPC ............. *H01Q 21/26* (2013.01); *H01Q 1/246* (2013.01); *H01Q 1/521* (2013.01); *H01Q 5/42* (2015.01); *H01Q 21/062* (2013.01); *H01Q 21/08* (2013.01)

(58) Field of Classification Search
CPC ........ H01Q 21/26; H01Q 1/246; H01Q 21/24; H01Q 21/06–08
See application file for complete search history.

(56) References Cited

U.S. PATENT DOCUMENTS 6,252,552 B1 6/2001 Tarvas et al.
9,570,804 B2 2/2017 Shang et al.
(Continued)

FOREIGN PATENT DOCUMENTS

CN 101208825 A 6/2008
CN 111555030 A 8/2020
(Continued)

OTHER PUBLICATIONS

"Extended European Search Report for European Application No. 19921917.1, dated Oct. 5, 2022, 9 pages".
(Continued)

*Primary Examiner* — Hasan Islam
(74) *Attorney, Agent, or Firm* — Myers Bigel, P.A.

(57) ABSTRACT

Radiating elements for a base station antennas include a first dipole radiator that extends along a first axis, the first dipole radiator including a first dipole arm and a second dipole arm. At least one of the first and second dipole arms includes first and second spaced-apart conductive segments that are connected to each other via both a first inductor and a second inductor that are electrically in parallel with one another.

17 Claims, 10 Drawing Sheets

(51) Int. Cl.

| | |
|---|---|
| ***H01Q 5/42*** | (2015.01) |
| ***H01Q 21/06*** | (2006.01) |
| ***H01Q 21/08*** | (2006.01) |
| ***H01Q 21/26*** | (2006.01) |

(56) References Cited

U.S. PATENT DOCUMENTS

| | | | |
|---|---|---|---|
| 10,439,285 B2 | 10/2019 | Isik et al. | |
| 10,770,803 B2 | 9/2020 | Varnoosfaderani et al. | |
| 11,018,437 B2 | 5/2021 | Tang et al. | |
| 2009/0174604 A1 | 7/2009 | Keskitalo et al. | |
| 2017/0294704 A1 | 10/2017 | Sun et al. | |
| 2017/0310009 A1 | 10/2017 | Isik et al. | |
| 2018/0226720 A1 | 8/2018 | Wall et al. | |
| 2018/0323513 A1 | 11/2018 | Varnoosfaderani et al. | |
| 2021/0175639 A1* | 6/2021 | Wang | H01Q 21/0075 |

FOREIGN PATENT DOCUMENTS

| | | |
|---|---|---|
| CN | 112164869 A | 1/2021 |
| CN | 112186333 A | 1/2021 |
| CN | 112186341 A | 1/2021 |
| CN | 112290199 A | 1/2021 |
| CN | 112421219 A | 2/2021 |
| CN | 112768895 A | 5/2021 |
| CN | 112787061 A | 5/2021 |
| CN | 112821044 A | 5/2021 |
| CN | 213304351 U | 5/2021 |

OTHER PUBLICATIONS

"International Search Report and Written Opinion of the International Searching Authority", International Application No. PCT/CN2019/079630, Dec. 30, 2019, 9 pp.

* cited by examiner

MULTIBAND BASE STATION ANTENNAS HAVING WIDEBAND CLOAKED RADIATING ELEMENTS AND/OR SIDE-BY-SIDE ARRAYS THAT EACH CONTAIN AT LEAST TWO DIFFERENT TYPES OF RADIATING ELEMENTS

CROSS-REFERENCE TO RELATED APPLICATION

The present application is a 35 U.S.C. § 371 national stage application of PCT Application No. PCT/CN2019/079630, filed on Mar. 26, 2019, the entire content of which is incorporated herein by reference as if set forth in its entirety. The above-referenced PCT Application was published in the English language as International Publication No. WO 2020/191605 A1 on Oct. 1, 2020.

BACKGROUND

The present invention generally relates to radio communications and, more particularly, to base station antennas for cellular communications systems.

Cellular communications systems are well known in the art. In a typical cellular communications system, a geographic area is divided into a series of regions that are referred to as "cells," and each cell is served by a base station. The base station may include baseband equipment, radios and base station antennas that are configured to provide two-way radio frequency ("RF") communications with subscribers that are positioned throughout the cell. In many cases, the cell may be divided into a plurality of "sectors," and separate base station antennas provide coverage to each of the sectors. The antennas are often mounted on a tower, with the radiation beam ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is perpendicular to the horizontal plane that is defined by the horizon. Reference will also be made to the azimuth plane, which is a horizontal plane that bisects the base station antenna, and to the elevation plane, which is a plane extending along the boresight pointing direction of the antenna that is perpendicular to the azimuth plane.

A common base station configuration is the "three sector" configuration in which a cell is divided into three 120° sectors in the azimuth plane. A base station antenna is provided for each sector. In a three sector configuration, the antenna beams generated by each base station antenna typically have a Half Power Beamwidth ("HPBW") in the azimuth plane of about 65° so that each antenna beam provides good coverage throughout a 120° sector. Three such base station antennas provide full 360° coverage in the azimuth plane. Typically, each base station antenna will include a so-called "linear array" of radiating elements that includes a plurality of radiating elements that are arranged in a vertically-extending column. Each radiating element may have an azimuth HPBW of approximately 65° so that the antenna beam generated by the linear array will have a HPBW of about 65° in the azimuth plane. By providing a phase-controlled column of radiating elements extending along the elevation plane, the HPBW of the antenna beam in the elevation plane may be narrowed to be significantly less than 65°, with the amount of narrowing increasing with the length of the column in the vertical direction.

As the volume of cellular traffic has grown, cellular operators have added new cellular services in a variety of new frequency bands. When these new services are introduced, the existing "legacy" services typically must be maintained to support legacy mobile devices. In some cases, it may be possible to use linear arrays of so-called "wideband" or "ultra-wide-band" radiating elements to support service in the new frequency bands. In other cases, however, it may be necessary to deploy additional linear arrays (or planar arrays) of radiating elements to support service in the new frequency bands. Due to local zoning ordinances and/or weight and wind loading constraints, there is often a limit as to the number of base station antennas that can be deployed at a given base station. Thus, to reduce the number of antennas, many operators deploy so-called "multiband" base station antennas that include multiple linear arrays of radiating elements that communicate in different frequency bands to support multiple different cellular services.

One multiband base station antenna that is currently in demand includes two linear arrays of "low-band" radiating elements that are used to provide service in some or all of the 617-960 MHz frequency band and two linear arrays of "mid-band" radiating elements that are used to provide service in some or all of the 1427-2690 MHz frequency band. These linear arrays are mounted in side-by-side fashion. These antennas, however, may be challenging to implement in a commercially acceptable manner because achieving a 65° azimuth HPBW antenna beam in the low-band typically requires low-band radiating elements that are at least 200 mm wide. When two low-band arrays are placed side-by-side, with mid-band linear arrays arranged therebetween, the width of the base station antenna may become unacceptably large.

SUMMARY

Pursuant to embodiments of the present invention, radiating elements for base station antennas are provided that include a first dipole radiator that extends along a first axis, the first dipole radiator including a first dipole arm and a second dipole arm. At least one of the first and second dipole arms includes first and second spaced-apart conductive segments that are connected to each other via both a first inductor and a second inductor that are electrically in parallel with one another.

These radiating elements may further include a second dipole radiator that extends along a second axis, the second dipole radiator including a third dipole arm and a fourth dipole arm and the second axis being generally perpendicular to the first axis. All four of the first through fourth dipole arms may include first and second spaced-apart conductive segments that are connected to each other via respective first and second inductors that are electrically in parallel with one another. In such embodiments, each of the first through fourth dipole arms may further include a third conductive segment that is spaced-apart from the respective second conductive segments on each of the first through fourth dipole arms, where the second and third conductive segments of each of the first through fourth dipole arms are connected to each other via a respective third inductor and a respective fourth inductor that are electrically in parallel with one another.

In some embodiments, the third inductor and the fourth inductor on the respective first through fourth dipole arms may comprise respective third and fourth conductive trace segments that each have respective average widths that are less than one-fourth average widths of the first conductive segments on the respective first through fourth dipole arms.

In some embodiments, an inductance of the first inductor may be less than an inductance of the second inductor.

In some embodiments, the first inductor and the second inductor may be implemented as respective first and second conductive trace segments that have respective average widths that are each less than one-fourth an average width of the first conductive segment.

In some embodiments, the radiating element may be provided as part of a base station antenna that also includes a higher-band radiating element that is positioned adjacent the radiating element, where a first electrical length of the first conductive trace section and a second electrical length of the second conductive trace section are selected so that currents induced by radio frequency signals in an operating frequency band of the higher-band radiating element on the first dipole radiator that pass through the first and second conductive trace sections experience different respective first and second phase shifts. In some embodiments, the first and second phase shifts may differ by approximately 180° for RF signals having at least one frequency within the operating frequency band of the higher-band radiating element.

In some embodiments, the first dipole radiator may be formed on a printed circuit board, the first and second spaced-apart conductive segments may comprise first and second spaced-apart metal pads on the printed circuit board, and the first inductor and the second inductor may each comprise respective first and second meandered conductive trace sections. In some embodiments, a length of the first meandered conductive trace section may be less than a length of the second meandered conductive trace section.

In some embodiments, the first and second inductors may create a high impedance for currents that are at a frequency that is approximately twice the highest frequency in the operating frequency range of the radiating element.

In some embodiments, the radiating element is configured to operate in the 617-896 MHz frequency band.

Pursuant to further embodiments of the present invention, radiating elements for base station antennas are provided that include a feed stalk and a first dipole radiator mounted on the feed stalk, the first dipole radiator including a first dipole arm and a second dipole arm. The first dipole arm includes first and second widened conductive segments that are spaced-apart from each other and that are connected by both a first conductive path and by a second conductive path that is separate and distinct from the first conductive path, wherein an average width of each of the first and second widened conductive segments is at least four times an average width of the first conductive path and at least four times an average width of the second conductive path.

In some embodiments, an inductance of the first conductive path may be less than an inductance of the second conductive path.

The radiating element may be part of a base station antenna that also includes a higher-band radiating element that is positioned adjacent the radiating element. In such embodiments, a first electrical length of the first conductive path and a second electrical length of the second conductive path may be selected so that currents induced by radio frequency signals in an operating frequency band of the higher-band radiating element on the first dipole radiator that pass through the first and second conductive paths experience different respective first and second phase shifts.

In some embodiments, the first and second phase shifts may differ by approximately 180° for RF signals having at least one frequency within the operating frequency band of the higher-band radiating element.

In some embodiments, the first dipole radiator may be formed on a printed circuit board, and the first and second spaced-apart widened conductive segments may comprise first and second spaced-apart metal pads on the printed circuit board. In such embodiments, the first conductive path and the second conductive path each may comprise respective first and second meandered conductive trace segments on the printed circuit board.

In some embodiments, the first conductive path and the second conductive path may together create a high impedance for currents that are at a frequency that is approximately twice the highest frequency in the operating frequency range of the radiating element.

In some embodiments, a length of the first conductive path may be less than a length of the second conductive path.

In some embodiments, the radiating element may further include a second dipole radiator that includes a third dipole arm and a fourth dipole arm, and all four of the first through fourth dipole arms may include first and second widened conductive segments that are spaced-apart from each other and that are connected to each other by both a first conductive path and by a second conductive path that is separate and distinct from the first conductive path that are electrically in parallel with one another.

Pursuant to additional embodiments of the present invention, radiating elements for base station antennas are provide that include a feed stalk and a first dipole radiator that is mounted on the feed stalk, the first dipole radiator including a first dipole arm and a second dipole arm. The first dipole arm includes first and second widened conductive segments that are physically and electrically connected to each other by both a first meandered trace section that has a first length and a second trace section that has a second length that is different from the first length and the first meandered trace section and the second trace section are electrically disposed in parallel.

In some embodiments, the second trace section may be a second meandered trace section.

In some embodiments, the first meandered trace section and the second trace section have respective average widths that are each less than one-fourth an average width of the first conductive segment.

Pursuant to still further embodiments of the present invention, base station antennas are provided that include a first linear array of radiating elements that extends along a first vertical axis and that is configured to operate in a first frequency band and a second linear array of radiating elements that extends along a second vertical axis and that is configured to operate in the first frequency band. The radiating elements included in the first linear array include at least first type radiating elements and second type radiating elements, the second type radiating elements having a different design than the first type radiating elements and the radiating elements included in the second linear array also include at least first type radiating elements and second type of radiating elements. At least one of the first type radiating elements in the first array is horizontally adjacent one of the second type radiating elements in the first array.

In some embodiments, the first type radiating elements may be half-wave cross-dipole radiating elements and the second type radiating elements may be full-wave cross-dipole radiating elements.

In some embodiments, each first type radiating element in the first linear array may be horizontally adjacent a respective one of the second type radiating elements in the second linear array.

In some embodiments, each first type radiating element in the first linear array may be vertically adjacent a respective one of the second type radiating elements in the first linear array.

In some embodiments, each first type radiating element in the first linear array may be horizontally adjacent a respective one of the second type radiating elements in the second linear array and each first type radiating element in the first linear array may be vertically adjacent a respective one of the second type radiating elements in the first linear array.

Pursuant to yet additional embodiments of the present invention, base station antennas are provided that include first through fourth RF ports, a first linear array that is coupled to the first and second RF ports via a first feed network, the first linear array including both half-wave cross dipole radiating elements and full-wave cross-dipole radiating element that each operate in a first frequency band and a second linear array that is coupled to the third and fourth RFs port via a second feed network, the second linear array including both half-wave cross dipole radiating elements and full-wave cross-dipole radiating element that each operate in the first frequency band.

In some embodiments, each full-wave cross dipole radiating element in the first linear array may be horizontally adjacent a respective one of the half-wave cross dipole radiating elements in the second linear array.

In some embodiments, each full-wave cross dipole radiating element in the first linear array may be vertically adjacent a respective one of half-wave cross dipole radiating elements in the first linear array.

DETAILED DESCRIPTION

Conventionally, the low-band frequency range extended between 696-960 MHz, and cellular service was supported at several distinct frequency bands within the low-band frequency range. Recently, the 617-698 MHz band was opened for cellular service, creating a demand for base station antennas that include wideband linear arrays of low-band radiating elements that operate across the full 617-960 MHz range or at least across the 617-896 MHz frequency range. These base station antennas typically also include two or more linear arrays of mid-band radiating elements that are mounted in close proximity to the low-band linear arrays in order to provide a compact antenna design. Unfortunately, however, undesired interaction between the low-band and mid-band radiating elements that can arise due to the close proximity of the adjacent arrays can negatively impact the antenna beams formed by the mid-band linear arrays. For example, as noted above, the low-band radiating elements may be designed to operate in all or part of the 617-960 MHz frequency range while the mid-band radiating elements may be designed to operate in all or part of the 1427-2690 MHz frequency range. Undesirable interaction between the low-band and mid-band radiating elements tends to occur when the low-band radiating elements resonate at the wavelength of a mid-band RF signal. This is particularly prone to occur when the mid-band radiating elements are transmitting and receiving signals that are at frequencies that are approximately twice the center frequency of the operating frequency band of the low-band radiating elements. Under these conditions, the low-band radiating elements (or components of the low-band radiating elements) may resonate in response to the mid-band signals such that mid-band currents are induced, for example, on the dipole arms of the low-band radiating elements. This type of interaction may cause a scattering of the mid-band RF signals that can negatively impact various characteristics of the mid-band antenna beams including the azimuth and elevation beamwidths, beam squint, antenna beam pointing angle, gain, front-to-back ratio, cross-polarization discrimination and the like. Moreover, the effects of scattering may vary significantly with frequency, which may make it hard to compensate for these effects using other techniques.

Figure 1:
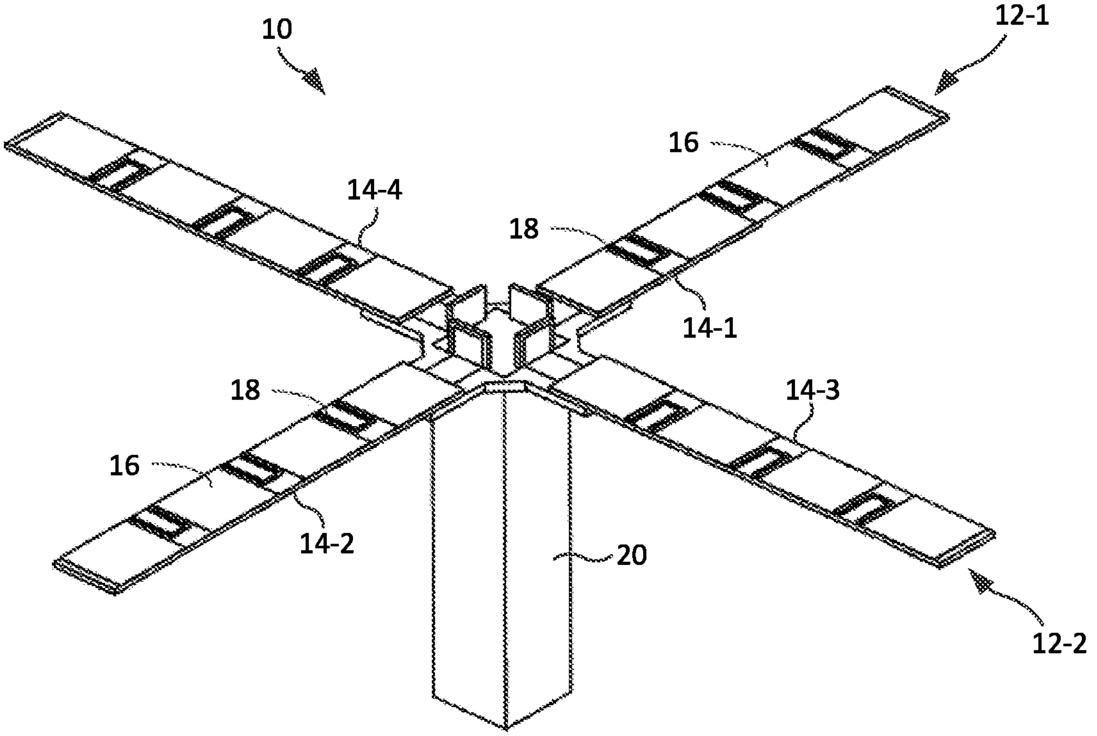
FIG. 1 (Prior Art)
FIG. 1 is a side perspective view of a conventional "cloaked" low-band radiating element for a base station antenna.

So-called "cloaked" low-band radiating elements have been developed that are designed to be "transparent" to RF signals in the mid-band frequency range. FIG. 1 is a perspective view of an example cloaked low-band radiating element 10 that is disclosed in U.S. Patent Publication No. 2017/0310009. As shown in FIG. 1, the conventional cloaked low-band radiating element 10 includes first and second dipole radiators 12-1, 12-2 that are mounted on a feed stalk 20. Each dipole radiator comprises a pair of dipole arms 14-1 through 14-4. Each dipole arm 14 may be, for example, approximately 0.2 to 0.35 of an operating wavelength in length, where the "operating wavelength" refers to the wavelength corresponding to the center frequency of the operating frequency band of the radiating element 10. Each dipole arm 14 may be formed as a metal pattern on a printed circuit board that includes a plurality of widened conductive segments 16 that are physically and electrically connected by narrow meandered trace segments 18. Note that herein like elements may be assigned two-part reference numerals. These elements may be referred to individually by their full reference numeral (e.g., dipole arm 14-2) and collectively by the first part of their reference numeral (e.g., the dipole arms 14).

The narrowed meandered trace sections 18 are designed to act as high impedance sections that to interrupt currents associated with a nearby mid-band radiating element that otherwise would be induced on the dipole arms 14. The narrowed meandered trace sections 18 are designed to create this high impedance for mid-band currents without significantly impacting the ability of the low-band currents to flow on the dipole arms 14. As such, the narrowed meandered trace sections 18 may reduce induced mid-band currents on the low-band radiating element 10 and consequent disturbance to the antenna pattern of nearby mid-band linear arrays (not shown).

The narrowed meandered trace sections 18 act like inductors that help to interrupt currents in the mid-band frequency range while allowing currents in the low-band frequency range to pass between adjacent widened conductive segments 16. However, the inductance associated with the narrowed meandered trace sections 18 may make it harder to impedance match the dipole radiators 12 to the feed stalk 20, particularly at the lower end of the operating frequency range of the low-band radiating element 10. Thus, while the low-band radiating element 10 may be effective in "cloaking" the mid-band currents (i.e., in reducing the propensity of the mid-band currents to be induced on the low-band dipole arms 14), the low-band radiating element 10 may also be more difficult to impedance match and hence may have a relatively constrained operating bandwidth.

Pursuant to embodiments of the present invention, cloaked cross-dipole low-band radiating elements for base station antennas are provided that have expanded operating bandwidths. For example, pursuant to specific embodiments, low-band radiating elements are provided that operate across the full 617-896 MHz frequency range with good impedance matching as well as effective cloaking of mid-band currents. The low-band radiating elements according to embodiments of the present invention may allow for compact multiband antennas having linear arrays that operate over wide frequency ranges.

The cloaked cross-dipole low-band radiating elements according to some embodiments of the present invention may be dual-polarized radiating elements that include first and second dipole radiators that extend along respective first and second perpendicular axes. Each dipole radiator may include a pair of dipole arms. The first dipole radiator may directly radiate RF signals at a +45° polarization and the second dipole radiator may directly radiate RF signals at a −45° polarization. In some embodiments, each dipole arm of the cloaked cross-dipole low-band radiating elements may include a plurality of widened conductive segments that are interconnected by a plurality of narrowed trace sections, similar to the conventional low-band radiating element discussed above with reference to FIG. 1. However, the cloaked low-band radiating elements according to embodiments of the present invention may use at least two narrowed trace sections to connect at least some pairs of adjacent widened conductive segments instead of a single narrowed trace section. For example, a pair of narrowed trace sections that are coupled electrically in parallel to each other may be used to connect each adjacent pair of widened conductive segments. The narrowed trace sections may have different lengths. While not intending to be bound by any theory of operation, it is believed that the lengths of the narrowed trace sections may be set so that mid-band currents traversing one of the parallel narrowed trace sections will be out-of-phase with mid-band currents traversing the other of the parallel narrowed trace sections, and hence a portion of any mid-band currents that pass from a first widened conductive segment through the parallel set of narrowed trace sections to a second widened conductive segment may tend to cancel each other out in the second widened conductive segment. This may provide enhanced cloaking performance. The lower inductance value associated with the shorter of the parallel narrowed trace sections may make it easier to impedance match the dipole arm over a wider bandwidth. Thus, the low-band radiating elements according to embodiments of the present invention may provide both good impedance matching and good cloaking performance.

The dipole arms may be implemented, for example, on a printed circuit board or other generally planar substrate. The cross-dipole dual polarized radiating elements according to embodiments of the present invention may further include feed stalks which may be implemented, for example, on printed circuit boards. In some embodiments, the feed stalks may support the dipole arms in front of a backplane such as a reflector.

Pursuant to further embodiments of the present invention, base station antennas are provided that include first and second vertically-extending linear arrays of radiating elements that operate in the same frequency band, where each linear array includes at least two different types of radiating elements. For example, each linear array could include a mix of half-wave cross-dipole radiating elements and full-wave cross-dipole radiating elements. Generally speaking, the full-wave radiating elements, which are longer than the half-wave radiating elements, provide a more directive (i.e., narrower) "element" pattern that theoretically should provide an antenna beam having a more desirable shape. However, there is often a need to limit the overall width of the base station antenna, which forces the two linear arrays of radiating elements that operate in the same frequency band closer together, which leads to coupling between adjacent horizontally adjacent radiating elements in the two arrays. This coupling can degrade the actual antenna patterns.

Implementing each of the first and second linear arrays as a "mixed" array that includes both full-wave and half-wave cross-dipole radiating elements may reduce coupling between the two arrays. For example, in some embodiments, each full-wave cross-dipole radiating element in the first array may be horizontally adjacent a half-wave cross-dipole radiating element in the second array, and vice-versa. Since the half-wave cross-dipole radiating elements are smaller than the full-wave cross-dipole radiating elements, the minimum distance between the radiating elements of the two arrays may be increased by this technique, resulting in less coupling between the arrays and less disturbance of the antenna patterns. It has been found that the antenna patterns that result when the first and second linear arrays are each implemented as "mixed" arrays may be better than the antenna patterns generated when both arrays are implemented using all full-wave cross-dipole radiating elements or all half-wave cross-dipole radiating elements.

Embodiments of the present invention will now be described in further detail with reference to the attached figures.

Figure 2A:
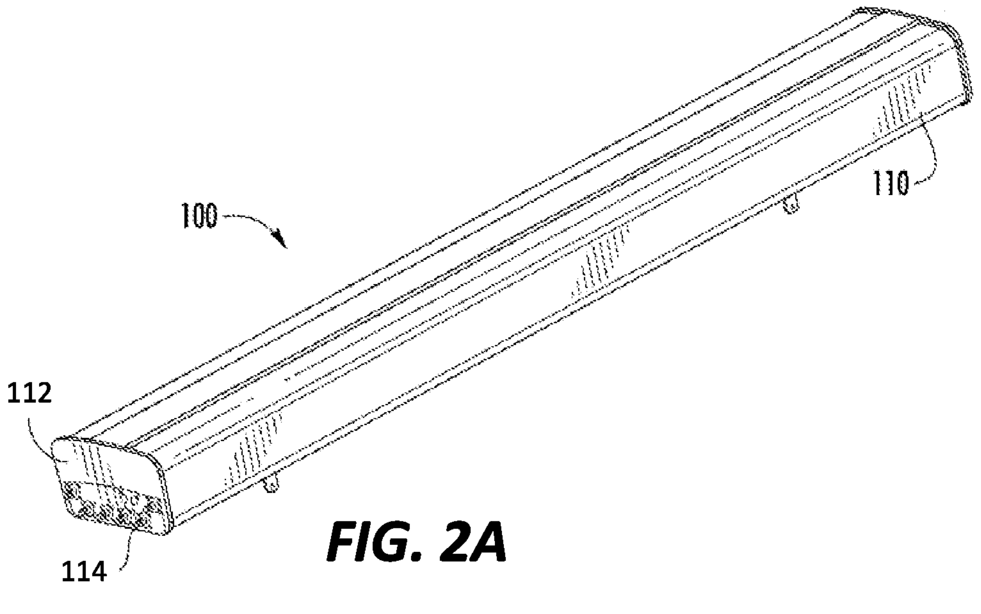
FIG. 2A is a perspective view of a base station antenna according to embodiments of the present invention.
Figure 2B:
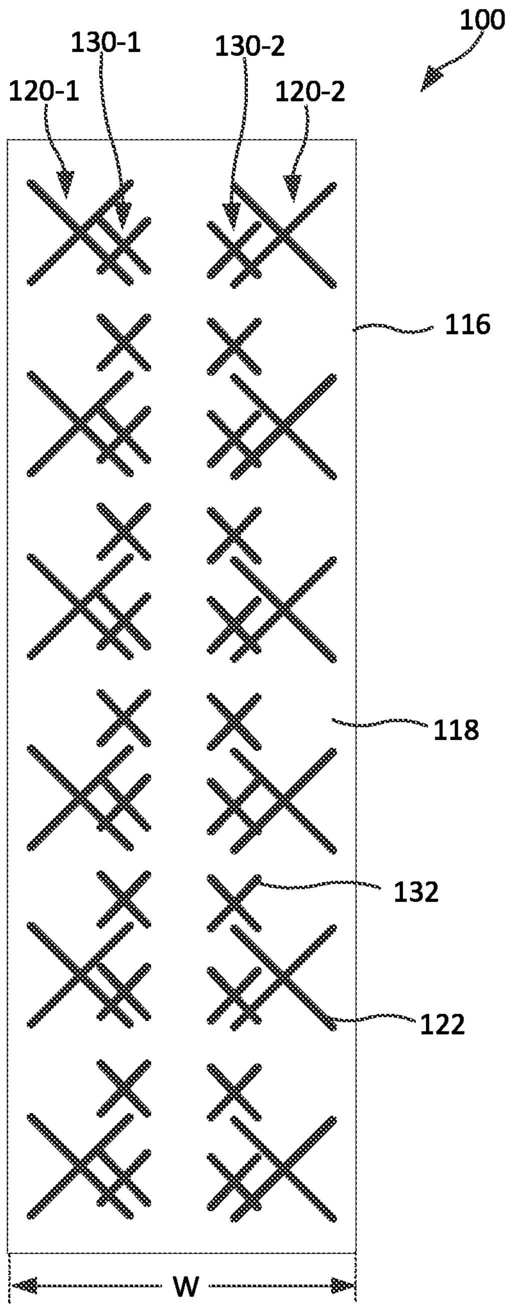
FIG. 2B is a schematic front view of the base station antenna of FIG. 2A with the radome removed that schematically illustrates the linear arrays of radiating elements included in the antenna.

FIGS. 2A and 2B illustrate a base station antenna 100 according to certain embodiments of the present invention. In particular, FIG. 2A is a perspective view of the base station antenna 100, while FIG. 2B is a schematic front view of the base station antenna 100 with the radome removed that schematically illustrates the linear arrays of radiating elements included in the antenna 100.

As shown in FIGS. 2A-2B, the base station antenna 100 is an elongated structure that extends along a longitudinal axis. The base station antenna 100 may have a tubular shape with a generally rectangular cross-section. The antenna 100 includes a radome 110 and a bottom end cap 112. A plurality of RF connectors 114 may be mounted in the bottom end cap 112. The antenna 100 is typically mounted in a vertical configuration (i.e., the longitudinal axis may be generally perpendicular to a plane defined by the horizon when the antenna 100 is mounted for normal operation).

Referring to FIG. 2B, the base station antenna 100 includes an antenna assembly 116 that may be slidably inserted into the radome 110. The antenna assembly 116 includes a backplane structure 118 that may act as both a ground plane and as a reflector for the antenna 100.

First and second linear arrays 120-1, 120-2 of low-band radiating elements 122 are mounted to extend forwardly from the reflector 118. First and second linear arrays 130-1, 130-2 of mid-band radiating elements 132 are also mounted to extend forwardly from the reflector 118. The first and second linear arrays 130-1, 130-2 of mid-band radiating elements 132 are mounted between the first and second linear arrays 120-1, 120-2 of low-band radiating elements 122. In order to reduce the width W of antenna 100, each of the linear arrays 130-1, 130-2 of mid-band radiating elements 132 may be in close proximity to a respective one of the linear arrays 120-1, 120-2 of low-band radiating elements 122. Moreover, while not shown in FIG. 2B, the low-band radiating elements 122 extend farther forwardly from the reflector 118 than do the mid-band radiating elements 132. In fact, at least some of the mid-band radiating elements 132 may be "covered" by a corresponding low-band radiating element 122, meaning that an axis that is perpendicular to the reflector 118 may extend through both the low-band radiating element 122 and the mid-band radiating element 132. Additionally, the two linear arrays 120-1, 120-2 of low-band radiating elements 122 may also be in close proximity to each other.

In an example embodiment, the low-band radiating elements 122 may be configured to transmit and receive signals in the 617-896 MHz frequency range. It will be appreciated, however, that embodiments of the present invention are not limited thereto, and that in other embodiments the low-band radiating elements 122 may be configured to transmit and receive signals in other frequency ranges such as, for example, the 617-960 MHz frequency range, the 694-960 MHz frequency range, etc. The mid-band radiating elements 132 may be configured to transmit and receive signals in a higher frequency range than the low-band radiating elements 122. In example embodiments, the mid-band radiating elements 132 may be configured to transmit and receive signals 1427-2690 MHz frequency range or a smaller portion thereof.

As will be discussed in greater detail below, the low-band radiating elements 122 and the mid-band radiating elements 132 may each comprise dual-polarized cross-dipole radiating elements. Consequently, each linear array 120, 130 may be used to form two separate antenna beams, namely an antenna beam at each of two orthogonal polarizations. Thus, the antenna 100 may generate a total of eight antenna beams to support eight separate RF ports. In the depicted embodiment, each radiating element 122 in the first low-band array 120-1 is horizontally aligned with a respective radiating element 122 in the second low-band array 120-2, and each radiating element 132 in the first mid-band array 130-1 is horizontally aligned with a respective radiating element 132 in the second mid-band array 130-2. However, it will be appreciated that embodiments of the present invention are not limited thereto and that, for example, the linear arrays 120 may be staggered in the vertical direction. It will likewise be appreciated that the radiating elements in some or all of the linear arrays may not be perfectly aligned along a vertical axis but instead some of the radiating elements may be staggered with respect to other of the radiating elements in a particular array. Staggered linear arrays may be used, for example, to narrow the azimuth beamwidth of the antenna beams generated by the linear array.

Figure 3:
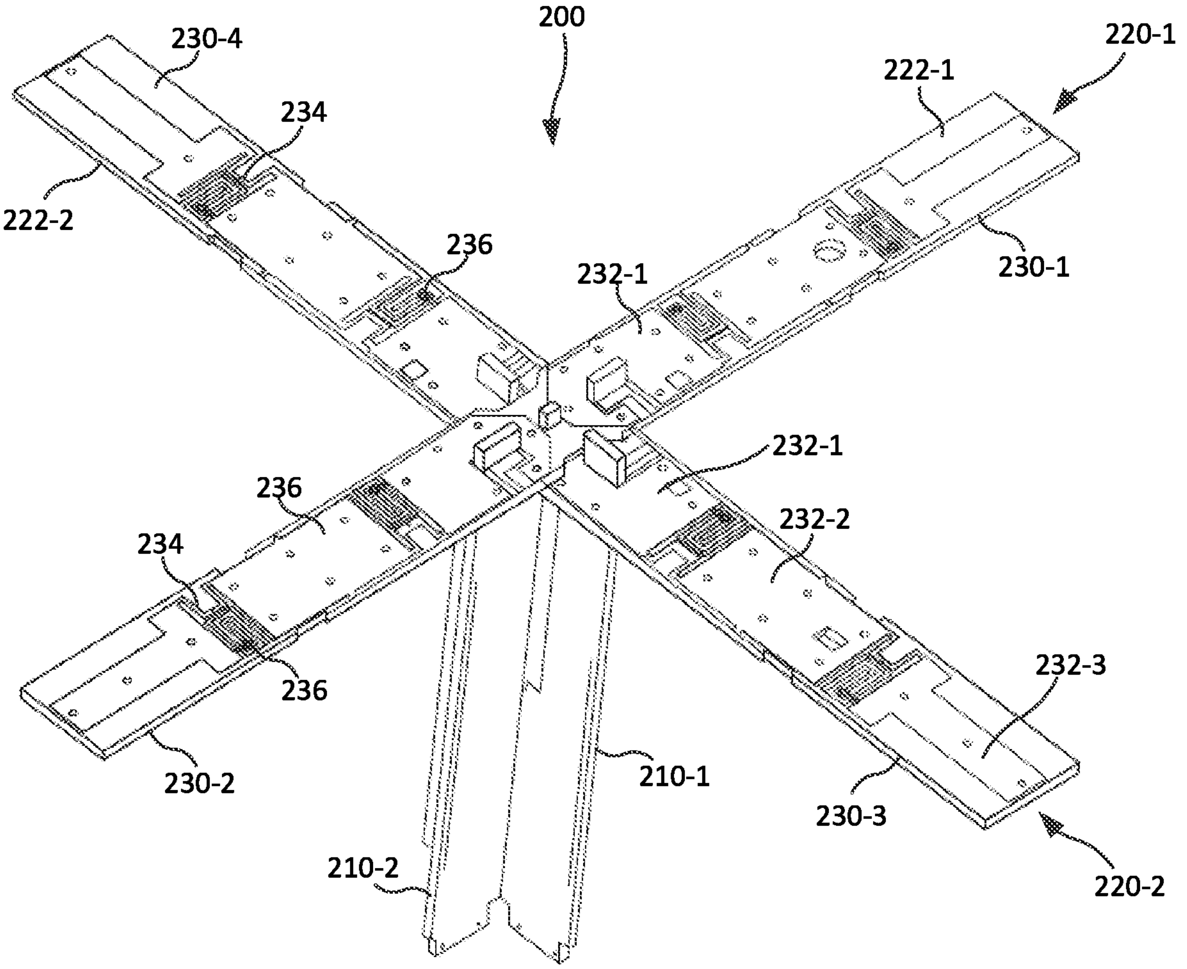
FIG. 3 is a perspective view of a cloaked low-band radiating element according to embodiments of the present invention that may be used in the base station antenna of FIGS. 2A-2B.
Figure 4A:
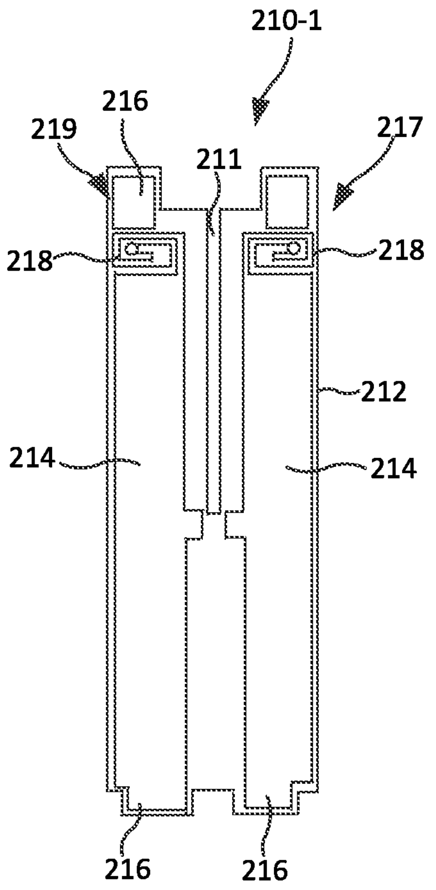
FIG. 4A is an enlarged view of one of the sides of one of the feed stalks of the cloaked low-band radiating element of FIG. 3.
Figure 4B:
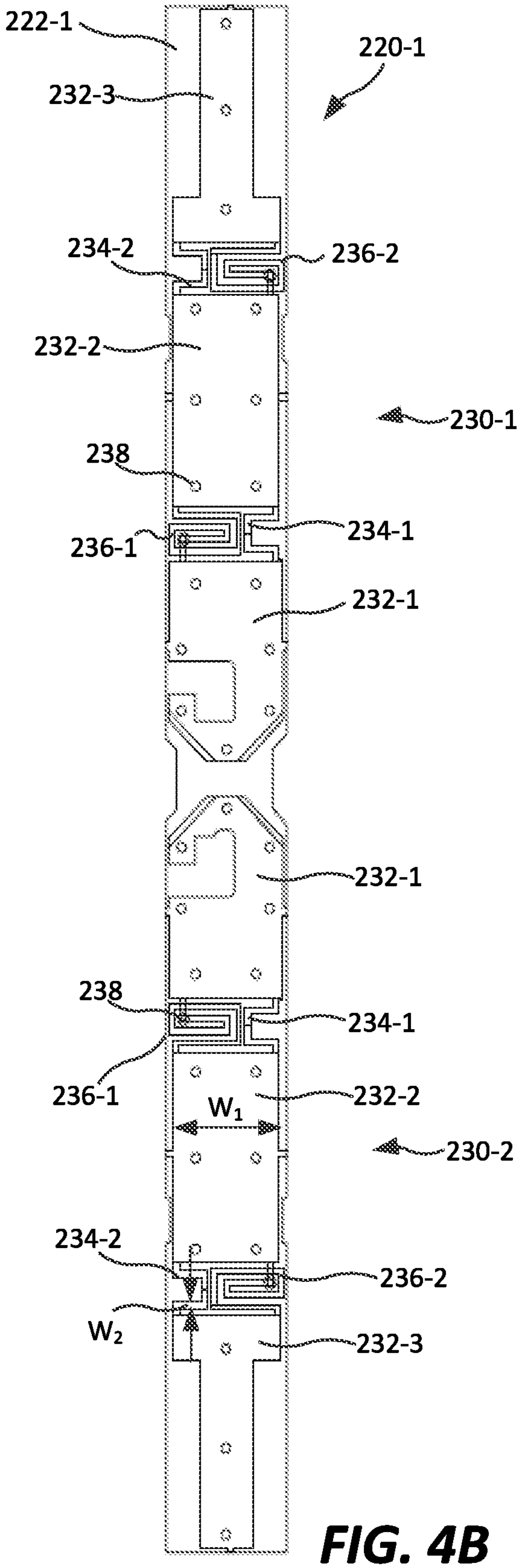
FIG. 4B is an enlarged front view of one of the dipole radiators of the cloaked low-band radiating element of FIG. 3.

FIG. 3 is a perspective view of a cloaked low-band radiating element 200 pursuant to embodiments of the present invention that may be used to implement the cloaked low-band radiating elements 120 that are included in the base station antenna 100 of FIG. 2A-2B. FIG. 4A is an enlarged view of one side of one of the feed stalks of the cloaked low-band radiating element of FIG. 3. FIG. 4B is an enlarged front view of one of the dipole radiators of the cloaked low-band radiating element of FIG. 3.

As shown in FIG. 3, the low-band radiating element 200 includes a pair of feed stalks 210-1, 210-2, and first and second dipole radiators 220-1, 220-2. The first dipole radiator 220-1 extends along a first axis and the second dipole radiator 220-2 extends along a second axis that is generally perpendicular to the first axis. Consequently, the first and second dipole radiators 220-1, 220-2 may be arranged in the general shape of a cross when viewed from the front. The first dipole radiator 220-1 includes first and second dipole arms 230-1, 230-2, and the second dipole radiator 220-2 includes third and fourth dipole arms 230-3, 230-4. In the depicted embodiment, each dipole radiator 220-1, 220-2 is implemented using a separate printed circuit board 222-1, 222-2. In other embodiments, both dipole radiators 220-1, 220-2 may be implemented on a single printed circuit board, or each dipole arm 230-1 through 230-4 may comprise its own printed circuit board 222. When the base station antenna 100 is mounted for normal operation, the first dipole radiator 220-1 may extend along a first axis that is angled at about +45 degrees with respect to a longitudinal (vertical) axis of the antenna 100, and the second dipole radiator 220-2 may extend along a second axis that is angled at about −45 degrees with respect to the longitudinal axis of the antenna 100. Consequently, the first dipole radiator 220-1 may transmit and receive RF signals at a +45 degree slant polarization, and the second dipole radiator 220-2 may transmit and receive RF signals at a −45 degree slant polarization.

The feed stalks 210 may extend in a direction that is generally perpendicular to a plane defined by the printed circuit board 222-1. The feed stalks 210 may have RF transmission lines 214 formed thereon (see FIG. 4A) that are used to pass RF signals between the dipole radiators 220 and other components of the base station antenna 100. The feed stalks 210 are also used to mount the dipole radiators 220 at an appropriate distance in front of the reflector 118 of antenna 100. The dipole radiators 220 may be mounted approximately 3/16 to 1/4 an operating wavelength forwardly of the reflector 118 by the feed stalks 210 in some embodiments. Moreover, while the dipole radiators 220-1, 220-2 each extend in planes that are generally parallel to the plane defined by the reflector, it will be appreciated that in other embodiments the dipole arms 220-1, 220-2 could be rotated 90° along their respective longitudinal axes to be perpendicular to the reflector (or rotated some other angle).

Each dipole arm 230 may have a length that is, for example, approximately 0.2 to 0.35 of an operating wavelength of the low-band radiating element 200. The “operating wavelength” refers to the wavelength corresponding to the center frequency of the operating frequency band of the radiating element 200. For example, if the low-band radiating elements 200 are designed as wideband radiating elements that are used to transmit and receive signals across the 617-896 MHz frequency band, then the center frequency of the operating frequency band would be 757 MHz and the corresponding operating wavelength would be 39.6 cm.

FIG. 4A illustrates a side of the feed stalk 210-1 of the low band radiating element 200. Feed stalk 210-2 may be substantially identical to feed stalk 210-1 except for the location of a slit 211 (discussed below). As shown in FIG. 4A, the first feed stalk 210-1 may comprise a printed circuit board 212 that has RF transmission lines 214 formed thereon. The first feed stalk 210-1 includes an upper vertical slit 211 and the second feed stalk 210-2 may include a lower vertical slit 211 that allow the two feed stalks 210 to be assembled together to form a forwardly extending column that has generally x-shaped vertical cross-section. Rear portions of each printed circuit board 212 may include metal-plated projections 216 that allow the rear end of each feed stalk 210 to be mounted into corresponding slits in a feed board in order to physically mount the feed stalks 210 on the feed board and electrically connect (via soldered connections) the RF transmission lines 214 on the feed stalks 210 to the feed board. Forward portions of each feed stalk 210 may similarly include metal-plated projections 216 that may extend through corresponding slits in the dipole radiators 220-1, 220-2 to allow the dipole radiators 220 to be mounted on the forward end of each feed stalk 210. Soldered connections may be used that electrically connect the RF transmission lines 214 on the feed stalks 210 to the respective dipole arms 230 in order to center feed the dipole radiators 220-1, 220-2. In particular, dipole arms 230-1 and 230-2 are center fed with a first RF signal so that together they radiate at a first polarization (the +45° polarization), and dipole arms 230-3 and 230-4 are center fed with a second RF signal so that together they radiate at a second polarization that is orthogonal to the first polarization (the −45° polarization).

While the reverse side of the first feed stalk 210-1 is not pictured, it may be of conventional design and may include an RF transmission line that extends from the rear of the feed stalk 210-1 that ends in a hook balun in the center of the printed circuit board 212. The hook balun couples RF signals input to the feed stalk 210-1 on the above-mentioned RF transmission line to the RF transmission lines 214 shown in FIG. 4A. Each feed stalk 210 also includes a pair of series inductor-capacitor (L-C) circuits 217 along the respective RF transmission lines 214. The inductor of each series L-C circuit 217 may be implemented, for example, as a spiral trace 218 on the printed circuit board 212, and the capacitor may be implemented, for example, as a plate capacitor 219 having electrodes on either side of the printed circuit board 212 (note that one end of each spiral inductor 218 ends at a plated-through hole that passes to the opposite side of the printed circuit board 212, where it connects to a metal plate (not shown) that is opposite a respective one of the metal plated projections 216 at the distal end of the feed stalk 210 which together form the plate capacitor 219.

FIG. 4B is a front view of dipole radiator 220-1 of the low band radiating element 200. Dipole radiator 220-2 may be identical to dipole radiator 220-1 and hence is not pictured separately. As shown in FIG. 4B, dipole radiator 220-1 includes first and second dipole arms 230-1, 230-2. Each dipole arm 230-1, 230-2 may be formed as a metal pattern on printed circuit board 222-1 that includes a plurality of widened conductive segments 232 that are connected by narrowed trace sections 234, 236. The narrowed trace sections 234, 236 may be implemented as meandered conductive traces. Herein, a meandered conductive trace refers to a non-linear conductive trace that follows a meandered path to increase the path length thereof. Using meandered conductive trace sections 234, 236 provides a convenient way to extend the length of the narrowed trace sections 234, 236 while providing trace sections 234, 236 that have a small physical footprint.

As shown in FIG. 4B, each dipole arm includes three widened conductive segments 232-1 through 232-3. Adjacent widened conductive segments 232-1 and 232-2 are physically and electrically connected by a first pair of narrowed trace sections 234-1, 236-1. Adjacent widened conductive segments 232-2 and 232-3 are physically and electrically connected by a second pair of narrowed trace sections 234-2, 236-2. Since the narrowed trace sections 234, 236 have a small physical footprint, adjacent widened conductive segments 232 may be in close proximity to each other so that the three widened conductive segments 232 together appear as a single dipole arm at frequencies within the operating frequency range of the low-band radiating element 200.

As shown in FIG. 4B, each dipole arm 230-1, 230-2 may have the same design. While not visible in FIG. 4B, the widened conductive segments 232 that are provided on the front side of the printed circuit board 222-1 are replicated on the back side of the printed circuit board 222-1 and are aligned with the widened conductive segments 232 that are provided on the front side of the printed circuit board 222-1. Metal-plated vias 238 are used to electrically connect the widened conductive segments 232 on the front side of printed circuit board 222-1 to the widened conductive segments 232 on the rear side of printed circuit board 222-1. Providing widened conductive segments 232 on both sides of printed circuit boards 222 may help increase the operating bandwidth of the low-band radiating element 200. In the depicted embodiment, the narrow trace sections 234 are all implemented as a trace section on the front side of the printed circuit board 222-1. In contrast, the narrow trace sections 236 are implemented as spiral trace sections that include portions on both the front and back sides of printed circuit board 222-1 that are connected by respective metal-plated vias 238.

The narrowed meandered trace sections 234, 236 are designed to act as high impedance sections that interrupt currents associated with a nearby mid-band radiating element that otherwise would be induced on the dipole arms 230. As discussed above, when a nearby mid-band radiating element transmits and receives signals, the mid-band RF signals may tend to induce currents on the dipole arms 230 of the low-band radiating element 200. This can particularly be true when the low-band and mid-band radiating elements are designed to operate in frequency bands having center frequencies that are separated by about a factor of two, as a low-band dipole arm 230 having a length that is a quarter wavelength of the low-band operating frequency will, in that case, have a length of approximately a half wavelength of the mid-band operating frequency. The greater the extent that mid-band currents are induced on the low-band dipole arms 230, the greater the impact on the characteristics of the radiation pattern of the linear arrays of mid-band radiating elements.

The narrowed meandered trace sections 234, 236 are designed to create a high impedance for mid-band currents without significantly impacting the ability of the low-band currents to flow on the dipole arms 230. As such, the narrowed meandered trace sections 234, 236 may reduce induced mid-band currents on the low-band radiating element 200 and consequent disturbance to the antenna pattern of nearby mid-band radiating elements (not shown). In some embodiments, the narrowed trace sections 234, 236 may make the low-band radiating element 200 almost invisible to nearby mid-band radiating elements, and thus the low-band radiating element 200 may not distort the mid-band antenna patterns.

As discussed above, while the use of dipole arms 230 that are formed as widened conductive segments 232 that are interconnected by narrowed trace sections 234 may help reduce or prevent radiation from nearby mid-band radiating elements inducing currents on the dipole arms 230, the high inductances associated with the narrowed trace sections 234 may make it difficult to obtain a good impedance match between the dipole arms 230 and the feed stalk 210 over a sufficiently wide frequency range. Consequently, the low-band radiating element 200 includes two narrowed trace sections 234, 236 to interconnect each pair of adjacent widened conductive segments 232. The two narrowed trace sections 234, 236 in each pair may be electrically connected in parallel to provide two parallel current paths between the two adjacent widened conductive segments 232. The first narrowed trace section 234 in each pair may be shorter than the second narrowed trace section 236 in the pair. As a result, mid-band currents travelling from a first widened conductive section 232-1 to a second widened conductive section 232-2 via the first narrowed trace section 234 may experience a different amount of phase change as compared to mid-band currents travelling from the first widened conductive section 232-1 to the second widened conductive section 232-2 via the second narrowed trace section 236.

While not intending to be bound by any theory of operation, it is believed that in some embodiments both good cloaking performance and good impedance matching performance may be achieved by selecting the lengths of the first and second narrowed trace sections 234, 236 so that, for currents induced by RF radiation at a mid-band frequency of interest, the current flowing through the complete length of the first narrowed trace section 234 may be approximately 180° out-of-phase with respect to current flowing through the complete length of the second narrowed trace section 236. As a result, mid-band currents that are able to flow from the first widened conductive section 232-1 to the second widened conductive section 232-2 will tend to cancel each other out at the second widened conductive section 232-2, such that mid-band currents will generally not flow on the dipole arms 230. Thus, good cloaking performance may be achieved. Moreover, the smaller inductance associated with the first narrowed trace section 234 may make it easier to impedance match the dipole radiators 220 to the respective feed stalks 210, allowing the low-band radiating element 200 to operate over a wider frequency range.

Each widened conductive segment 232 may have a respective width $W_1$, where the width $W_1$ is measured in a direction that is generally perpendicular to the direction of current flow along the respective widened conductive segment 232. The width $W_1$ of each widened conductive segment 232 need not be constant. The narrowed trace sections 234, 236 may similarly have widths $W_2$, where each width $W_2$ is measured in a direction that is generally perpendicular to the direction of instantaneous current flow along the narrowed trace sections 234, 236. The width $W_2$ of each narrowed trace section 234 and/or 236 also need not be constant.

The average width of each widened conductive segment 232 may be, for example, at least twice the average width of each narrowed trace section 234 and/or 236 in some embodiments. In other embodiments, the average width of each widened conductive segment 232 may be at least three times the average width of each narrowed trace section 234 and/or 236. In still other embodiments, the average width of each widened conductive segment 232 may be at least five times the average width of each narrowed trace section 234 and/or 236. In yet further embodiments, the average width of each widened conductive segment 232 may be at least seven times the average width of each narrowed trace section 234 and/or 236.

While the dipole arms 230 illustrated in FIGS. 3 and 4A are straight dipole arms, it will be appreciated that in other embodiments each dipole arm may be implemented as an open or closed loop. For example, U.S. Patent Publication No. 2018/0323513 ("the '513 publication"), filed Feb. 15, 2018, discloses cloaked radiating elements that include generally oval dipole arms. It will be appreciated that the narrow trace sections that are used to connect the widened conductive segments in any of the low-band radiating elements disclosed in the '513 publication may be replaced with a pair of narrow trace sections (e.g., narrowed trace sections that are electrically connected in parallel) pursuant to the techniques of the present invention. The entire content of the '513 publication is incorporated herein by reference.

Figure 5:
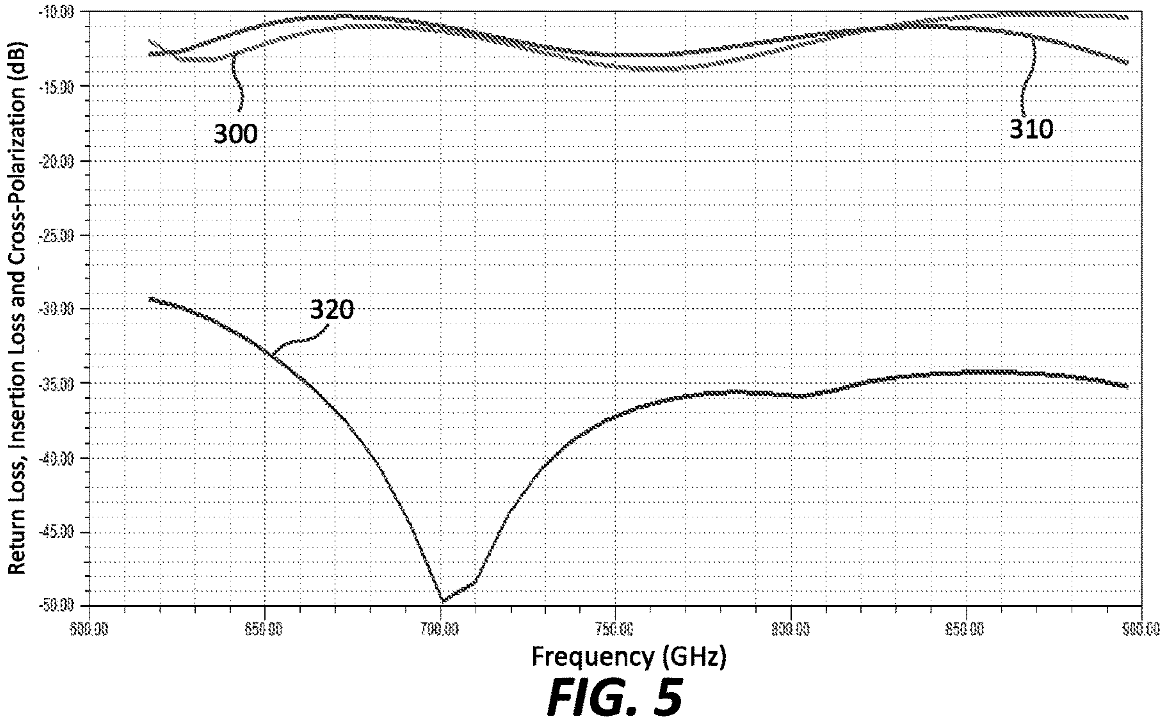
FIG. 5 is a graph showing the simulated return loss and cross-polarization isolation performance of the cloaked low-band radiating element of FIG. 3.

FIG. 5 is a graph showing the simulated return loss (curves 300, 310) for the dipole radiators 220 at the two orthogonal polarizations and cross-polarization isolation performance (curve 320) of the cloaked low-band radiating element 200 of FIG. 3. As shown in FIG. 5, the return loss varies between values of about −10 dB to −14 dB across the 617-896 MHz operating frequency range of low-band radiating element 200. This shows that the radiating element 200 is adequately impedance matched. Curve 320 shows that better than 30 dB cross-polarization isolation is achieved across the entire operating frequency range.

Figure 6:
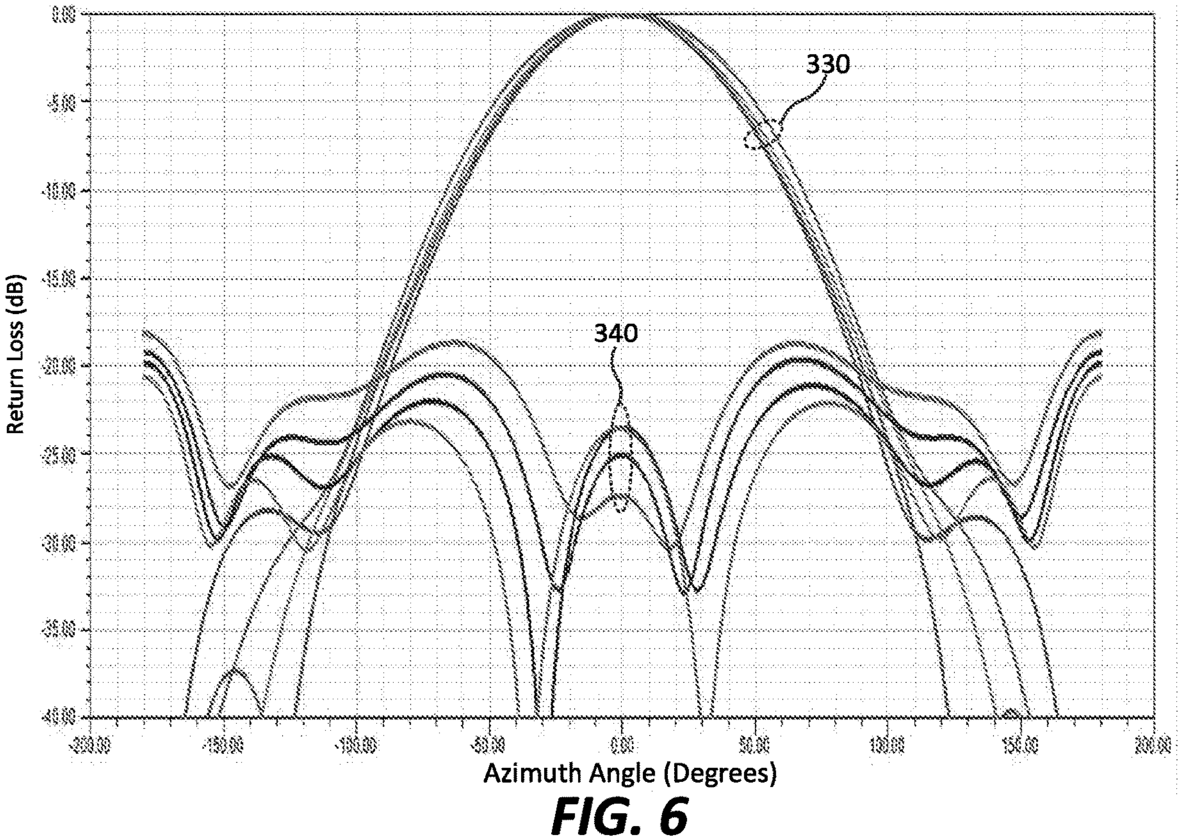
FIG. 6 is a graph showing the simulated azimuth pattern of the cloaked low-band radiating element of FIG. 3.

FIG. 6 is a graph showing the simulated azimuth pattern of the cloaked low-band radiating element of FIG. 3. The group of curves labelled 330 in FIG. 6 represent the primary polarization while the curves labelled 340 represent the cross-polarization. Multiple curves are included in FIG. 6 to show the performance at different selected frequencies across the 617-896 MHz operating frequency band of the low-band radiating element 200. As can be seen in FIG. 6, the low-band radiating element generates an antenna beam having a suitable azimuth beamwidth (about 65°) with low sidelobes and good cross-polarization discrimination.

Figure 7:
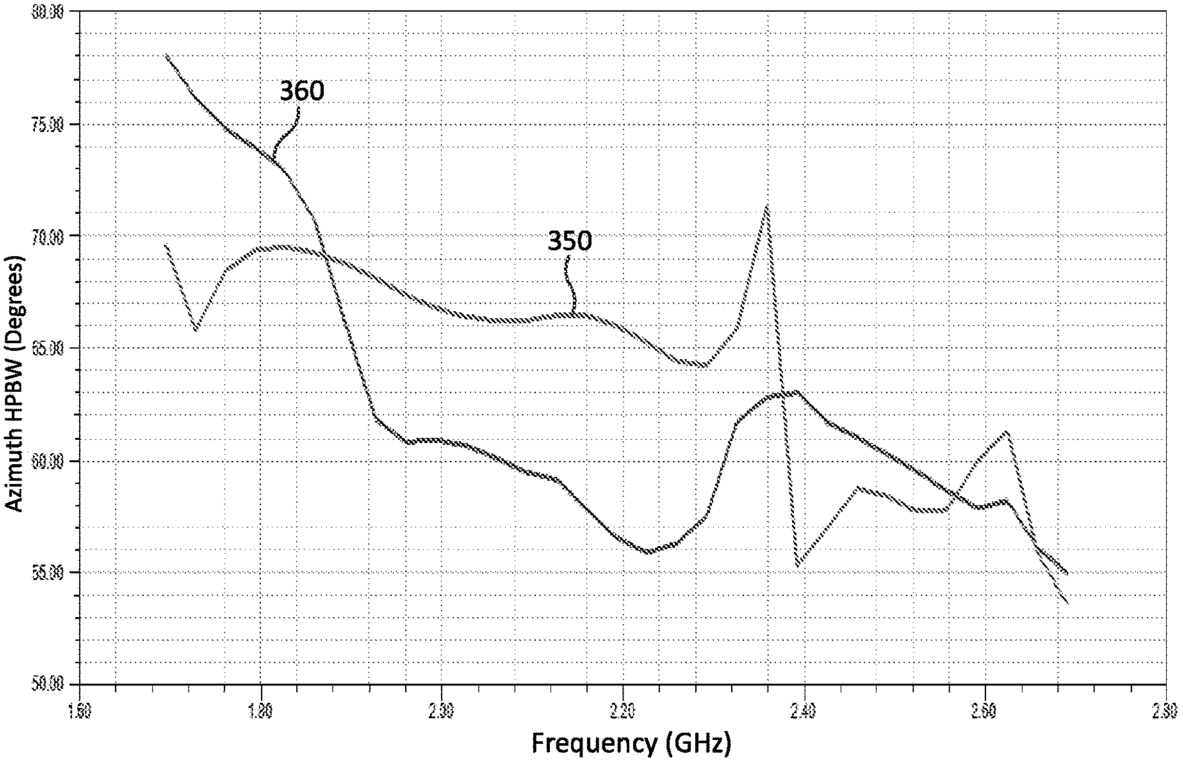
FIG. 7 is a graph showing the azimuth HPBW of a mid-band radiating element that is located adjacent the cloaked low-band radiating element of FIG. 3 for cases where the cloaked low-band radiating element does and does not include parallel inductive paths between adjacent widened dipole segments.

FIG. 7 is a graph (curve 350) showing the azimuth HPBW of one of the mid-band radiating elements 132 of FIG. 2B that is located adjacent a low-band radiating element 122 that is implemented as the cloaked low-band radiating element 200 of FIG. 3. For comparative purposes, FIG. 7 also includes a curve (curve 360) showing the azimuth HPBW of one of the mid-band radiating elements 132 of FIG. 2B that is located adjacent a low-band radiating element 122 that is implemented as the conventional cloaked low-band radiating element 10 of FIG. 1. As can be seen from FIG. 7, when the conventional cloaked low-band radiating element 10 is used, the azimuth HPBW varies between 55°-78°, which is generally considered to be an unacceptably large range for most applications. When the cloaked low-band radiating elements 200 according to embodiments of the present invention are used, the azimuth HPBW varies between 54°-71°, which represents significantly improved performance.

Figure 8A:
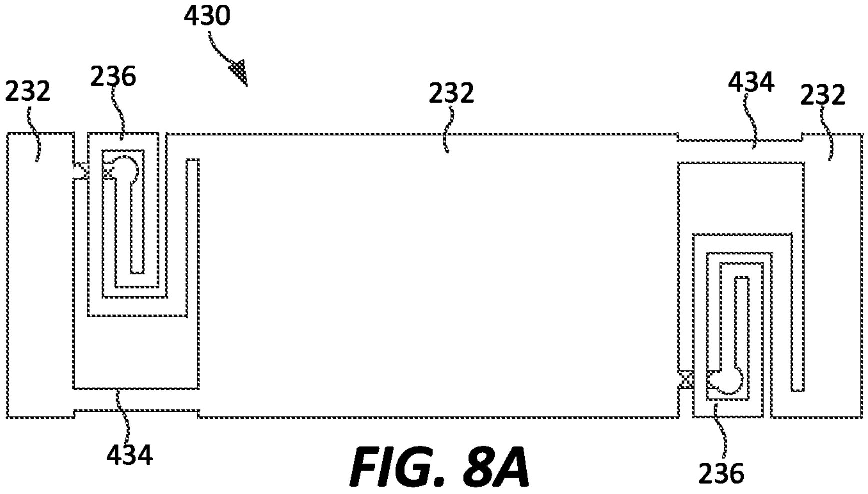
FIG. 8A is an enlarged front view of a portion of a dipole arm of a cloaked low-band radiating element according to further embodiments of the present invention.
Figure 8B:
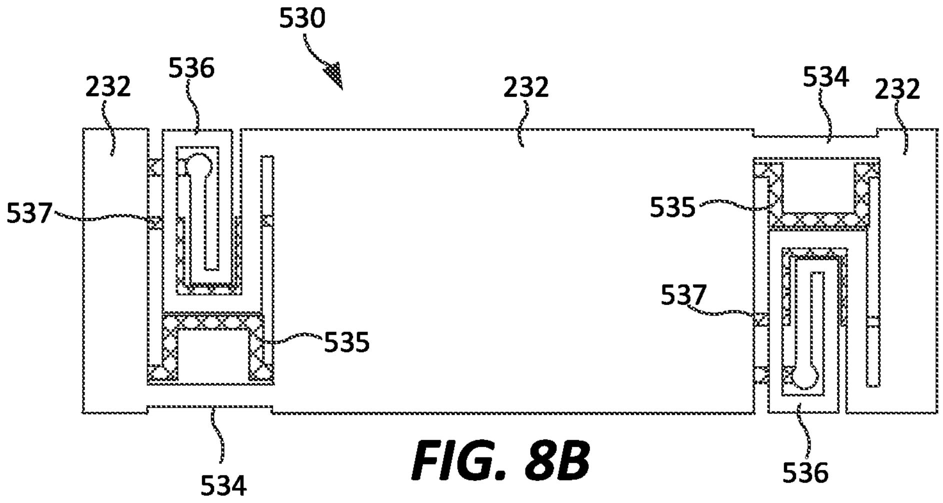
FIG. 8B is an enlarged front view of a portion of a dipole arm of a cloaked low-band radiating element according to additional embodiments of the present invention.
Figure 8C:
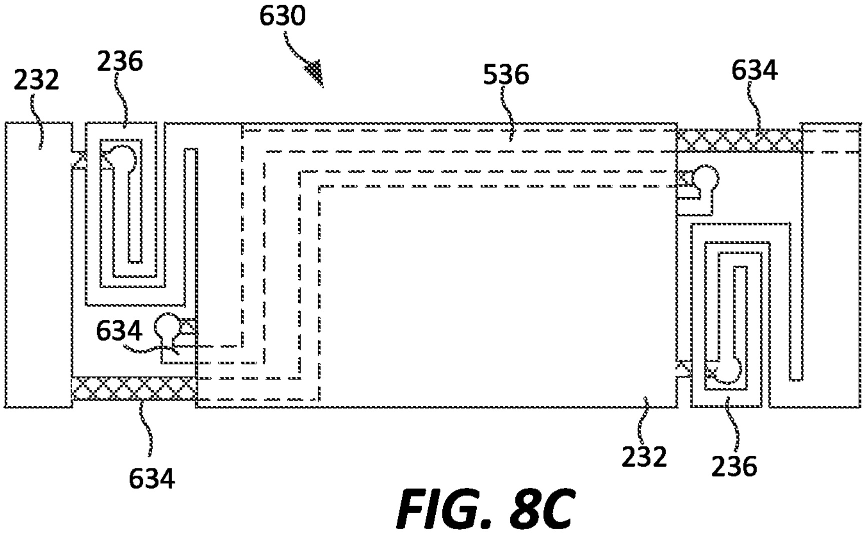
FIG. 8C is an enlarged front view of a portion of a dipole arm of a cloaked low-band radiating element according to still further embodiments of the present invention.

While FIGS. 3 and 4A-4B illustrate one example implementation of a cloaked radiating element according to embodiments of the present invention, it will be appreciated that numerous modifications may be made thereto without departing from the scope of the present invention. FIGS. 8A-8C illustrate several example modifications that may be made to the dipole arms 230 of low-band radiating element 200 according to further embodiments of the present invention. It will be appreciated that FIGS. 8A-8C each show the middle portion of a dipole arm (i.e., one widened conductive segment 232 and portions of two adjacent widened conductive sections 232 are illustrated in each of FIGS. 8A-8C, along with the narrowed trace sections that connect each pair of adjacent widened conductive segments 232). In each of FIGS. 8A-8C, the dielectric of the printed circuit board 222 is omitted so that the metal pattern on the rear side of the printed circuit board 222 is visible (and is shown using cross-hatching) if it is not "blocked" by the metal pattern on the front side of printed circuit board 222.

As shown in FIG. 8A, a dipole arm 430 is very similar to the dipole arms 230 discussed above, except that in dipole arm 430 the first narrowed trace sections 434 are straight trace sections that are used in place of the meandered trace sections 234 that are included in dipole arms 230. The lengths of the narrowed trace sections 434, 236 included in dipole arm 430 may be selected so that mid-band currents traversing the two narrowed trace sections 434, 236 will tend to cancel out due to the different phase delays imparted by the narrowed trace sections 434, 236. As dipole arm 430 may otherwise be identical to the dipole arm 230 that is discussed above, further description thereof will be omitted.

FIG. 8B is an enlarged partial front view of a dipole arm 530 of a cloaked low-band radiating element according to additional embodiments of the present invention. As shown in FIG. 8B, the dipole arm 530 is again similar to the dipole arms 230 discussed above, except that dipole arm 530 includes a total of four narrowed trace sections 534, 535, 536, 537 are used to connect each adjacent pair of widened conductive segments 232. The lengths of the narrowed trace sections 534, 535, 536, 537 may be selected so that mid-band currents traversing the four narrowed trace sections 534, 535, 536, 537 will tend to cancel out due to the different phase delays imparted by the narrowed trace sections 534, 535, 536, 537. As dipole arm 530 may otherwise be identical to the dipole arm 230 that is discussed above, further description thereof will be omitted.

While FIG. 8B illustrates an example dipole arm that includes a total of four narrowed trace sections to connect each pair of adjacent widened conductive sections, it will be appreciated that any number of narrowed trace sections (or other inductive sections) may be used, including three sections, five sections, six sections, etc. Additionally, it will be appreciated that different numbers of narrowed trace sections may be used to connect each pair of adjacent widened conductive sections.

FIG. 8C is an enlarged front view of a dipole arm 630 of a cloaked low-band radiating element according to still further embodiments of the present invention. As can be seen from FIG. 8C, the dipole arm 630 is similar to the dipole arms 230 discussed above, except that in dipole arm 630 the first narrowed trace sections 634 are implemented on the rear side of the printed circuit board 212 and connect to the far end of the widened conductive segment 232 as opposed to the end of the widened conductive segment that is adjacent the gap between the two widened conductive segments 232 that are connected by the narrowed trace sections 634, 236. Once again, the lengths of the narrowed trace sections 634, 236 included in dipole arm 630 may be selected so that mid-band currents traversing the two narrowed trace sections 634, 236 will tend to cancel out due to the different phase delays imparted by the narrowed trace sections 634, 236. As dipole arm 630 may otherwise be identical to the dipole arm 230 that is discussed above, further description thereof will be omitted.

While the discussion above focuses on low-band radiating elements, it will be appreciated that the techniques discussed above can be used with radiating elements that operate in any appropriate frequency band.

Figure 9:
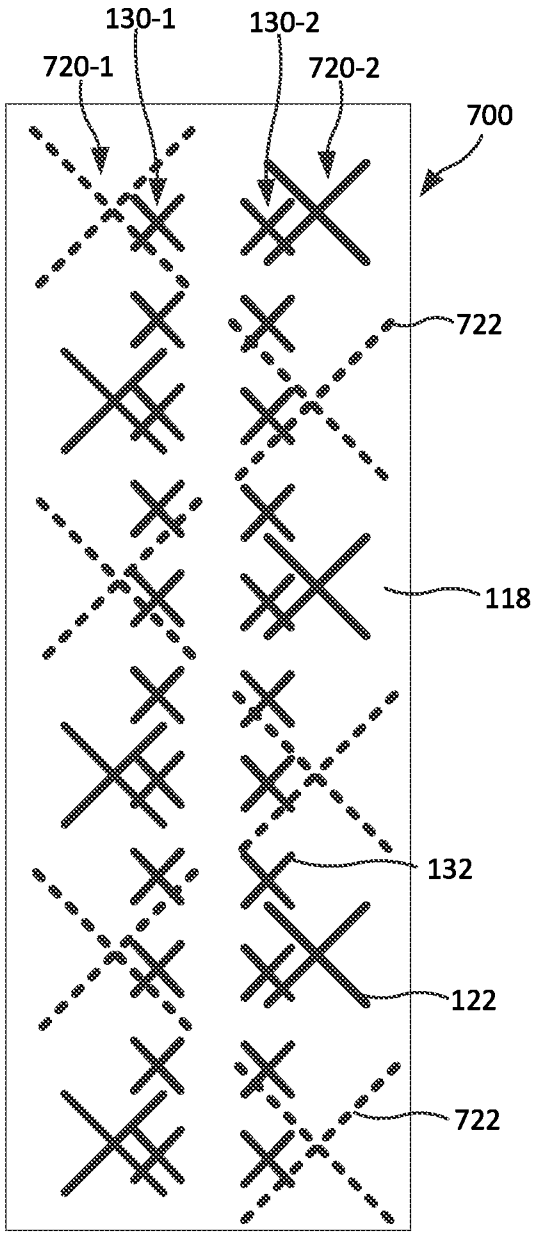
FIG. 9 is a schematic front view of a base station antenna according to further embodiments of the present invention with the radome removed that illustrates how side-by-side low-band arrays may each include two different types of low-band radiating elements to provide improved pattern performance.

FIG. 9 is a schematic front view of a base station antenna 700 according to further embodiments of the present invention with the radome removed that schematically illustrates how side-by-side low-band arrays may each include two different types of low-band radiating elements to provide improved pattern performance. As shown in FIG. 9, the base station antenna 700 is similar to base station antenna 100 that is discussed above, and like elements are identified using like reference numerals. The discussion below will focus on the differences between base station antenna 700 and base station antenna 100.

As shown in FIG. 9, the first and second linear arrays 120-1, 120-2 of low-band radiating elements 122 included in base station antenna 100 are replaced with first and second linear arrays 720-1, 720-2. Linear arrays 720-1 and 720-2 are each "mixed" linear arrays that include two different types of radiating elements. In the depicted embodiment, each linear array 720 includes three of the low-band radiating elements 122 as well as three low-band radiating elements 722.

The low-band radiating elements 122 are so-called "half-wave" radiating elements which include dipole radiators that have an electrical length of about ½ a wavelength corresponding to the center frequency of the operating frequency band for the low-band radiating elements 122. The actual length of each dipole radiator may vary from a half-wavelength because, for example, widened dipoles may be used that have an electrical length that is longer than the physical length of the dipole radiator. The low-band radiating elements 722 are so-called "full-wave" radiating elements which include dipole radiators that have an electrical length of between about ⅔ of a wavelength and one wavelength of the center frequency of the operating frequency band for the low-band radiating elements 722 (e.g., about ¾ of a wavelength in some embodiments). The actual length of each dipole radiator included in the low-band radiating elements 722 may again vary from the electrical length.

As the low-band radiating elements 722 are physically larger than the low-band radiating elements 122, they may provide a more directive antenna beam. This typically is advantageous, since the azimuth beamwidth may tend to become too large at the low end of the operating frequency band, and the increased directivity helps to solve this potential problem. However, if the low-band arrays 720 were implemented using all full-wave low-band radiating elements 722, and the width of the antenna was held constant, the distance between horizontally-adjacent low-band radiating elements 722 would be decreased. This reduction in the distance between the radiating elements 722 of the two low-band linear arrays 720 may result in increased coupling between the arrays 720, which can adversely affect the shape of the antenna beams generated by the two arrays 720.

The base station antenna 700 can provide improved performance for some applications by including a mixture of half-wave low-band radiating elements 122 and full-wave low-band radiating elements 722 in each low-band linear array 720. As shown, in one example embodiment, each half-wave radiating element 122 may be positioned adjacent a full-wave radiating element 722 of the other low-band linear array 720, and vice versa. This arrangement advantageously reduces coupling between the two arrays 720 by increasing the minimum distance between the radiating elements 122, 722 of the two arrays 720. Moreover, by implementing half of the radiating elements in the arrays 720 using full-wave radiating elements 722, the generated antenna beams may have increased directivity. This may result in improved azimuth HPBW and/or sector power ratio performance.

Figure 10:
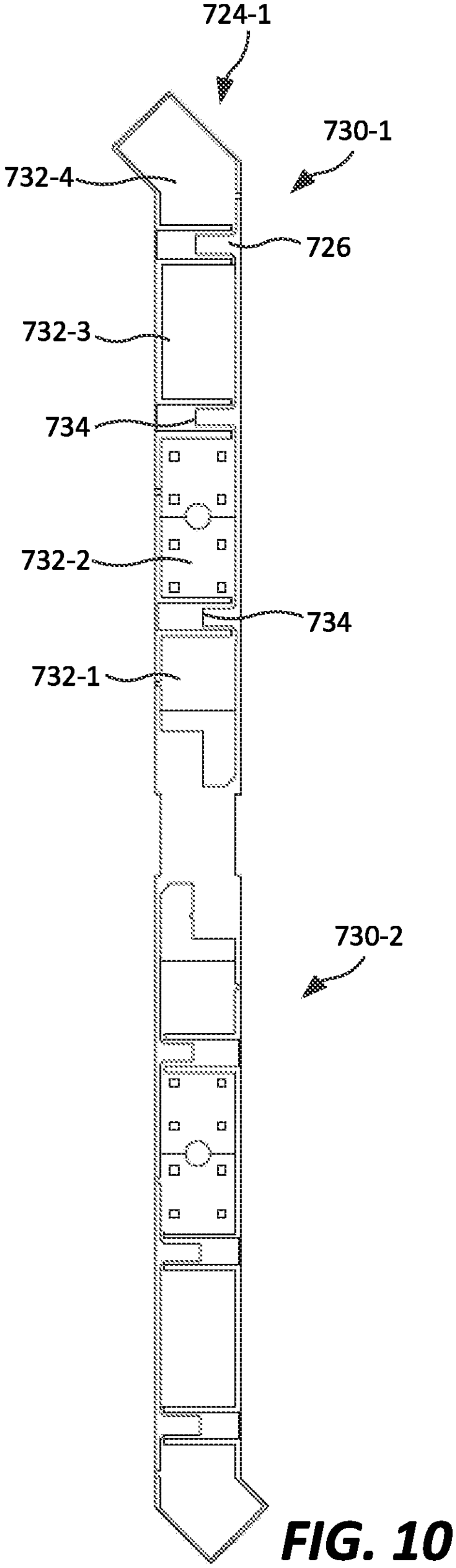
FIG. 10 is a front view of one of the dipole radiators of a cloaked "full-wave" low-band radiating element that may be included in the base station antenna of FIG. 9.

FIG. 10 is a front view of a dipole radiator 724-1 that is included in the full-wave low-band radiating elements 722 of FIG. 9. It will be appreciated that the full-wave low-band radiating elements 722 will include two such dipole radiators 724 when implemented as dual-polarized cross-dipole radiating elements, and that the radiating elements 722 will also include a feed stalk structure that is used to mount the dipole radiators 724 forwardly of the reflector 118 of base station antenna 700.

As shown in FIG. 10, the full-wave dipole radiator 724-1 includes first and second dipole arms 730-1, 730-2. Each dipole arm 730 may be formed as a metal pattern on a printed circuit board 726 that includes a plurality of widened conductive segments 732 that are connected by narrowed trace sections 734 that are implemented as meandered conductive traces. In this particular embodiment, only a single narrowed trace section 734 is used to connect each pair of widened conductive segments 732, which is similar to the conventional cloaked dipole design shown in FIG. 1. It will be appreciated, however, that in other embodiments, the single narrow trace section 734 may be replaced with a pair of narrow trace sections (e.g., narrowed trace sections that are electrically connected in parallel) pursuant to the techniques of the present invention in order to maintain good cloaking performance while also widening the operating bandwidth of the radiating element 722. In the depicted embodiment, each dipole arm 730-1, 730-2 includes a total of four widened conductive segments 732-1 through 732-4.

One performance parameter for a base station antenna is its "sector power ratio." The sector power ratio is the ratio of the RF power radiated outside the sector (i.e., at azimuth angles that are outside of the sector) to the RF power radiated within the sector (i.e., at azimuth angles that are within the sector). A very high-performing base station antenna will typically have a sector power ratio in the 3-4% range, although many base station antennas have higher (i.e., worse) sector power ratios (e.g., sector power ratios of 6-8%). Sector power ratio is an important performance parameter for an antenna, as power radiated outside of the sector is not only lost power that does not improve the performance of the antenna, this lost power may also represent interference that must be overcome in adjacent sectors.

Figure 11A:
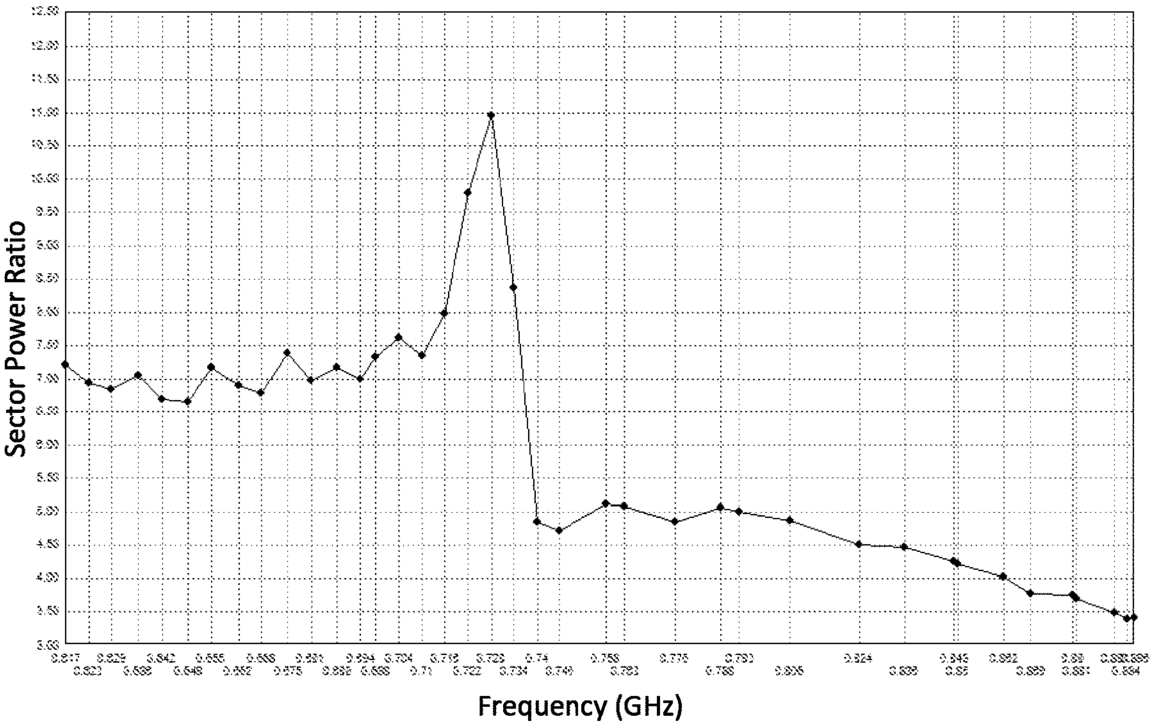
FIG. 11A is a graph illustrating the simulated sector power ratio performance of two side-by-side low-band arrays that are implemented using only radiating elements having full-wave dipole radiators.

FIG. 11A is a graph illustrating the simulated sector power ratio performance of two side-by-side low-band arrays that are implemented using only radiating elements having full-wave dipole radiators. As shown in FIG. 11A, The sector power ratio is in the 6.5-8.0 range in the lower portion of the operating frequency band, which is unacceptable for many applications, and has a better sector power ratio in 3.5-5.0 range in the higher portion of the operating frequency band. However, in the middle of the operating frequency band, the sector power ratio spikes to 11.0, which is unacceptable for essentially all applications. This increase in the sector power ratio occurs because of coupling between the full-wave radiating elements 722 of the two different arrays 720.

Figure 11B:
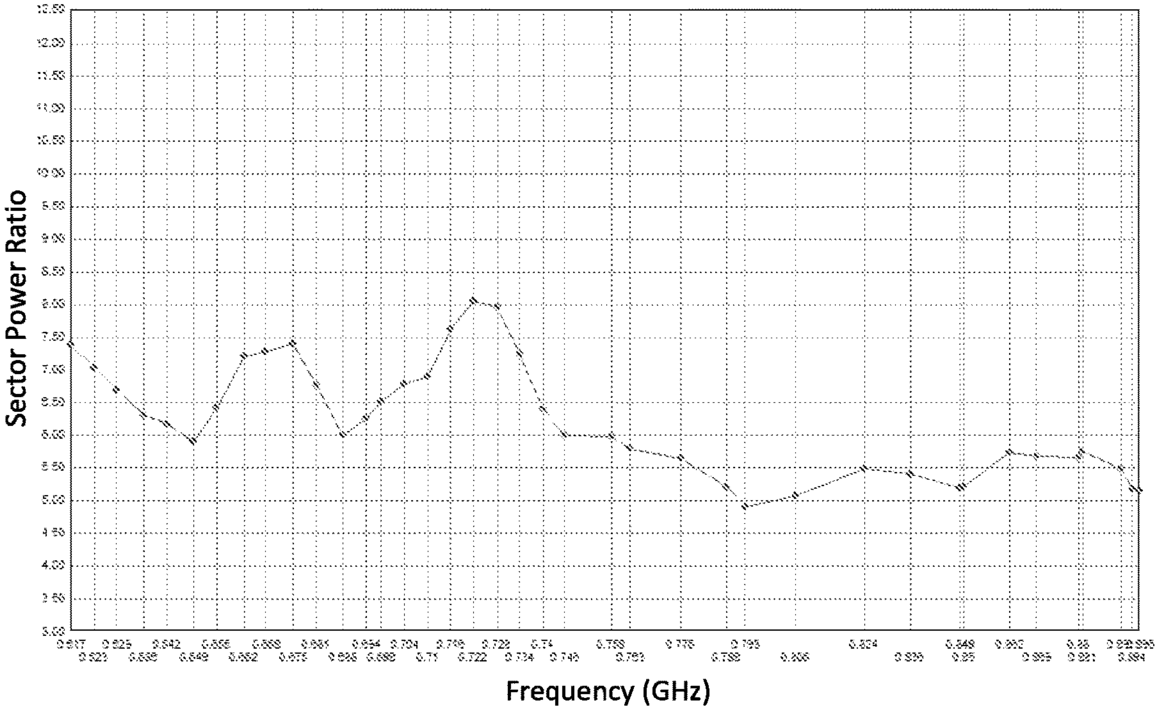
FIG. 11B is a graph illustrating the simulated sector power ratio performance of two side-by-side low-band arrays that are implemented using both radiating elements having half-wave dipole radiators and radiating elements having full-wave dipole radiators.

FIG. 11B is a graph illustrating the simulated sector power ratio performance of two side-by-side low-band arrays that are implemented using both radiating elements having half-wave dipole radiators and radiating elements having full-wave dipole radiators. As shown in FIG. 11B, similar performance is achieved at both the lower end and the upper end of the operating frequency range, while the large spike in the sector power ratio in the middle portion of the operating frequency band is largely eliminated.

Figure 12:
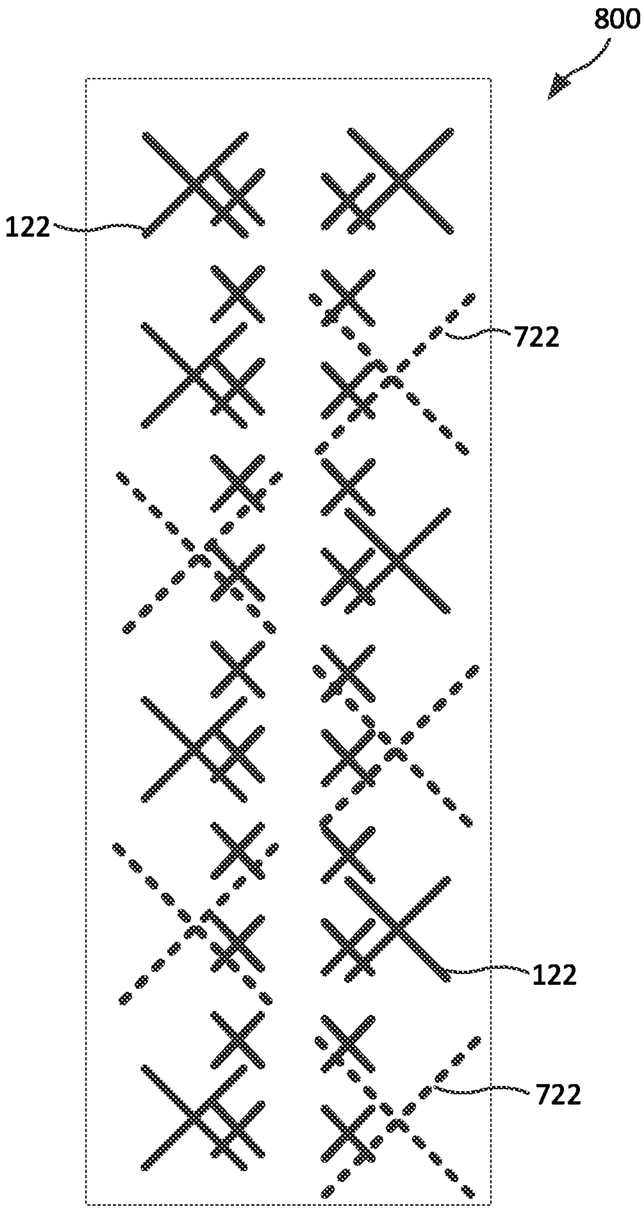
FIG. 12 is a schematic front view of a base station antenna according to still further embodiments of the present invention with the radome removed.

While FIG. 9 illustrates one example base station antenna 700 that includes side-by-side "mixed" linear arrays of radiating elements, it will be appreciated that numerous other designs are possible. By way of example, FIG. 12 schematically illustrates a base station antenna 800 that is very similar to base station antenna 700, except that the top full-wave low-band radiating element 722 in linear array 720-1 of base station antenna 700 is replaced with a half-wave low-band radiating element 122 in base station antenna 800.

It will likewise be appreciated that radiating elements other than half-wave and full-wave cross-dipole radiating elements may be used to implement the base station antennas 700, 800 in other embodiments. For example, either the half-wave or the full-wave cross-dipole radiating elements 122, 722 could be replaced with box dipole radiating elements or loop radiating elements in other embodiments. Any other suitable types of radiating elements may also be used. Likewise, it will also be appreciated that the radiating elements in the first and second linear arrays need not be low-band radiating elements, but could instead be radiating elements that operate in other frequency bands.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A radiating element for a base station antenna, comprising:

a first dipole radiator that includes a first dipole arm and a second dipole arm, wherein the first dipole arm includes first and second widened conductive segments that are spaced-apart from each other and that are connected by both a first conductive path and by a second conductive path that is separate and distinct from the first conductive path, wherein an average width of each of the first and second widened conductive segments is at least four times an average width of the first conductive path and at least four times an average width of the second conductive path, wherein the radiating element is provided in combination with the base station antenna, the base station antenna further comprising a higher-band radiating element that is positioned adjacent the radiating element, wherein a first electrical length of the first conductive path and a second electrical length of the second conductive path are selected so that currents induced by radio frequency signals in an operating frequency band of the higher-band radiating element on the first dipole radiator that pass through the first and second conductive paths experience different respective first and second phase shifts.

2. The radiating element of claim 1, wherein an inductance of the first conductive path is less than an inductance of the second conductive path.

3. The radiating element of claim 1, wherein the first and second phase shifts differ by approximately 180° for RF signals having at least one frequency within the operating frequency band of the higher-band radiating element.

4. The radiating element of claim 1, wherein the first dipole radiator comprises a printed circuit board, the first and second spaced-apart widened conductive segments comprise first and second spaced-apart metal pads on the printed circuit board, and the first conductive path and the second conductive path each comprise respective first and second meandered conductive trace sections on the printed circuit board.

5. The radiating element of claim 1, wherein the first conductive path and the second conductive path together create a high impedance for currents that are at a frequency that is approximately twice the highest frequency in an operating frequency range of the radiating element.

6. The radiating element of claim 1, wherein a length of the first conductive path is less than a length of the second conductive path.

7. The radiating element of claim 1, further comprising:

a second dipole radiator that includes a third dipole arm and a fourth dipole arm, wherein all four of the first through fourth dipole arms include first and second widened conductive segments that are spaced-apart from each other and that are connected to each other by both a first conductive path and by a second conductive path that is separate and distinct from the first conductive path that are electrically connected in parallel with one another.

8. A radiating element for a base station antenna, comprising:

a first dipole radiator that includes a first dipole arm and a second dipole arm, wherein the first dipole arm includes first and second widened conductive segments that are physically and electrically connected to each other by both a first meandered trace section that has a first length and a second trace section that has a second length that is different from the first length, and wherein the first meandered trace section and the second trace section are electrically connected in parallel.

9. The radiating element of claim 8, wherein the second trace section comprises a second meandered trace section.

10. The radiating element of claim 8, wherein the first meandered trace section and the second trace section have respective average widths that are each less than one-fourth an average width of the first widened conductive segment.

11. The radiating element of claim 10, in combination with the base station antenna, the base station antenna further comprising a higher-band radiating element that is positioned adjacent the radiating element, wherein a first electrical length of the first meandered trace section and a second electrical length of the second trace section are selected so that currents induced by radio frequency signals in an operating frequency band of the higher-band radiating element on the first dipole radiator that pass through the first meandered trace section and the second trace section experience different respective first and second phase shifts.

12. The radiating element of claim 11, wherein the first and second phase shifts differ by approximately 180° for RF signals having at least one frequency within the operating frequency band of the higher-band radiating element.

13. A radiating element for a base station antenna, comprising:

a first dipole radiator that extends along a first axis, the first dipole radiator including a first dipole arm and a second dipole arm, wherein the first dipole arm includes first and second spaced-apart conductive segments that are connected to each other via both a first conductive path and a second conductive path that are electrically connected in parallel with one another, and the second dipole arm includes third and fourth spaced-apart conductive segments that are connected to each other via both a third conductive path and a fourth conductive path that are electrically connected in parallel with one another.

14. The radiating element of claim 13, wherein the first through fourth conductive paths create a high impedance for currents that are at a frequency that is approximately twice the highest frequency in an operating frequency range of the radiating element.

15. The radiating element of claim 13, further comprising:

a second dipole radiator that extends along a second axis, the second dipole radiator including a third dipole arm and a fourth dipole arm and the second axis being generally perpendicular to the first axis, wherein the third dipole arm includes fifth and sixth spaced-apart conductive segments that are connected to each other via respective fifth and sixth conductive paths that are electrically connected in parallel with one another, and the fourth dipole arm includes seventh and eighth spaced-apart conductive segments that are connected to each other via respective seventh and eighth conductive paths that are electrically connected in parallel with one another.

16. The radiating element of claim 15, wherein each of the first through eighth conductive paths comprises a respective conductive trace segment that has a respective average width that is less than one-fourth an average width of the first conductive segment.

17. The radiating element of claim 16, in combination with the base station antenna, the base station antenna further comprising a higher-band radiating element that is positioned adjacent the radiating element, wherein a first electrical length of the first conductive trace segment and a second electrical length of the second conductive trace segment are selected so that currents induced by radio frequency signals in an operating frequency band of the higher-band radiating element on the first dipole radiator that pass through the first and second conductive trace segments experience different respective first and second phase shifts.

* * * * *